(12) United States Patent
Zhu et al.

(10) Patent No.: US 11,362,552 B2
(45) Date of Patent: Jun. 14, 2022

(54) ELECTRIC MACHINE COMPONENT AND METHOD TO FABRICATE

(71) Applicant: Ford Global Technologies, LLC, Dearborn, MI (US)

(72) Inventors: Leyi Zhu, Novi, MI (US); Feng Liang, Troy, MI (US); Michael W. Degner, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 901 days.

(21) Appl. No.: 16/154,825

(22) Filed: Oct. 9, 2018

(65) Prior Publication Data

US 2020/0112210 A1    Apr. 9, 2020

(51) Int. Cl.
*H02K 1/276* (2022.01)
*H02K 1/27* (2022.01)
(Continued)

(52) U.S. Cl.
CPC .............. *H02K 1/276* (2013.01); *H02K 1/16* (2013.01); *H02K 15/024* (2013.01); *H02K 15/03* (2013.01); *B60K 6/26* (2013.01); *B60L 50/50* (2019.02); *B60L 2220/10* (2013.01); *B60L 2220/50* (2013.01); *B60Y 2200/91* (2013.01); *B60Y 2200/92* (2013.01)

(58) Field of Classification Search
CPC .. H02K 1/02; H02K 1/04; H02K 1/16; H02K 1/27; H02K 1/276; H02K 1/2766; H02K 1/272; H02K 1/2713; H02K 15/024; H02K 15/03; B60K 6/26
See application file for complete search history.

(56) References Cited

U.S. PATENT DOCUMENTS 4,469,970 A * 9/1984 Neumann ............ H02K 1/2773
310/156.78
6,718,616 B2   4/2004 Fukui et al.
(Continued)

FOREIGN PATENT DOCUMENTS

CN      207732525 U  * 8/2018 ............... H02K 1/02
DE  102007022835 A1 * 11/2008 ........... H02K 1/2773
(Continued)

*Primary Examiner* — Edgardo San Martin
(74) *Attorney, Agent, or Firm* — David B. Kelley; Brooks Kushman P.C.

(57) ABSTRACT

An electric machine rotor including a first stamped rotor lamination and a first stamped sheet of a material different than the first stamped rotor lamination is provided. The first stamped rotor lamination may define a pair of magnet pockets. The first stamped sheet may be coplanar with and scarf jointed to the first stamped rotor lamination to define a center bridge between the magnet pockets that has a magnetic permeability less than, and a mechanical strength greater than, the first stamped rotor lamination. The rotor may further include a second stamped sheet of a material different than the first stamped rotor lamination coplanar with and scarf jointed to the first stamped rotor lamination to define a top bridge adjacent to one of the magnet pockets at a perimeter of the rotor that has a magnetic permeability less than, and a mechanical strength greater than, the first stamped rotor lamination.

17 Claims, 10 Drawing Sheets

(51) Int. Cl.
        *H02K 1/04*       (2006.01)
        *H02K 1/16*       (2006.01)
        *H02K 15/02*      (2006.01)
        *H02K 15/03*      (2006.01)
        *B60K 6/26*       (2007.10)
        *B60L 50/50*      (2019.01)

(56) References Cited

U.S. PATENT DOCUMENTS

| | | | |
|---|---|---|---|
| 10,355,537 B2 * | 7/2019 | Zhu | H02K 15/03 |
| 2010/0247229 A1 * | 9/2010 | Kaiser | F16D 1/06 |
| | | | 403/14 |
| 2016/0099635 A1 | 4/2016 | Liang et al. | |
| 2016/0121421 A1 | 5/2016 | Uhm et al. | |
| 2017/0154713 A1 * | 6/2017 | Simon | B23K 15/0086 |
| 2018/0152087 A1 | 5/2018 | Takahashi et al. | |
| 2018/0262069 A1 * | 9/2018 | Liang | H02K 1/2766 |
| 2018/0278100 A1 * | 9/2018 | Zhu | H02K 1/2766 |
| 2018/0287439 A1 * | 10/2018 | Degner | H02K 1/30 |
| 2018/0337565 A1 * | 11/2018 | Reddy | H02K 17/165 |
| 2018/0342916 A1 * | 11/2018 | Krizan | H02K 1/02 |
| 2020/0395801 A1 * | 12/2020 | Leonardi | H02K 1/276 |
| 2021/0075280 A1 * | 3/2021 | Leonardi | H02K 1/02 |

FOREIGN PATENT DOCUMENTS

| | | | | |
|---|---|---|---|---|
| DE | 102019220203 A1 * | 6/2021 | | |
| EP | 3540919 A1 * | 9/2019 | | H02K 1/276 |
| JP | 2004526400 A * | 8/2004 | | H02K 1/27 |
| WO | WO-2018097305 A1 * | 5/2018 | | H02K 1/28 |

\* cited by examiner

ELECTRIC MACHINE COMPONENT AND METHOD TO FABRICATE

TECHNICAL FIELD

The present disclosure relates to a structure of an electric machine rotor or stator lamination and a method to fabricate the same.

BACKGROUND

In current motor/generator core manufacturing processes, rotor or stator laminations are punched from an electrical steel sheet with homogeneous properties resulting in identical property characteristics within the rotor or stator lamination. However, high-performance motors/generators may have conflicting property requirements for different regions within the rotor or stator lamination. For example, it may be desired to have certain regions of the rotor or stator laminations with a low magnetic permeability and other regions to have a high magnetic permeability.

SUMMARY

An electric machine rotor includes a first stamped rotor lamination and a first stamped sheet of a material different than the first stamped rotor lamination. The first stamped rotor lamination defines a pair of magnet pockets. The first stamped sheet is coplanar with and scarf jointed to the first stamped rotor lamination to define a center bridge between the magnet pockets that has a magnetic permeability less than, and a mechanical strength greater than, the first stamped rotor lamination. The rotor may further include a second stamped sheet of a material different than the first stamped rotor lamination coplanar with and scarf jointed to the first stamped rotor lamination to define a top bridge adjacent to one of the magnet pockets at a perimeter of the rotor that has a magnetic permeability less than, and a mechanical strength greater than, the first stamped rotor lamination. The first stamped rotor lamination may further define a triangular-shaped pocket and may further include a second stamped sheet of a material different than the first stamped rotor lamination coplanar with and scarf jointed to the first stamped rotor lamination to define a vertex portion of the triangular-shaped pocket that has a mechanical strength greater than the first stamped rotor lamination. The rotor may further include a stamped ring of a material different than the first stamped rotor lamination coplanar with and scarf jointed to an outer perimeter of the first stamped rotor lamination to circumscribe the first stamped rotor lamination. The stamped ring may have a mechanical strength greater than the first stamped rotor lamination. The center bridge may be anchor-shaped. A material of the first stamped rotor lamination may be one of electrical steel or silicon steel and the material of the first stamped sheet may be one of a non-ferromagnetic metal or a non-ferromagnetic alloy.

An electric machine rotor includes a first stamped rotor lamination and a first stamped sheet of a material different than the first stamped rotor lamination. The first stamped rotor lamination defines magnet pockets. The first stamped sheet is coplanar with and joined to the first stamped rotor lamination to define a top bridge adjacent to one of the magnet pockets at a perimeter of the rotor that has a magnetic permeability less than, and a mechanical strength greater than, the first stamped rotor lamination. The rotor may further include a second stamped sheet of a material different than the first stamped rotor lamination coplanar with and joined to the first stamped rotor lamination to define a center bridge between the magnet pockets that has a magnetic permeability less than, and a mechanical strength greater than, the first stamped rotor lamination. The first stamped rotor lamination may further define a triangular-shaped pocket. The rotor may further include a second stamped sheet of a material different than the first stamped rotor lamination coplanar with and joined to the first stamped rotor lamination to define a vertex portion of the triangular-shaped pocket that has a mechanical strength greater than the first stamped rotor lamination. The rotor may further include a stamped ring of a material different than the first stamped rotor lamination coplanar with and joined to an outer perimeter of the first stamped rotor lamination to circumscribe the first stamped rotor lamination. The stamped ring may have a mechanical strength greater than the first stamped rotor lamination. A material of the first stamped rotor lamination may be one of electrical steel or silicon steel and the material of the first stamped sheet may be one of a non-ferromagnetic metal or a non-ferromagnetic alloy.

An electric machine rotor includes a first stamped rotor lamination and a stamped ring of a material different than the first stamped rotor lamination. The first stamped rotor lamination defines magnet pockets. The stamped ring of a material is coplanar with and joined to an outer perimeter of the first stamped rotor lamination to circumscribe the first stamped rotor lamination. The stamped ring has a mechanical strength greater than the first stamped rotor lamination. The rotor may further include a first stamped sheet of a material different than the first stamped rotor lamination coplanar with and joined to the first stamped rotor lamination to define a top bridge adjacent to one of the magnet pockets at a perimeter of the rotor that has a magnetic permeability less than, and a mechanical strength greater than, the first stamped rotor lamination. The first stamped rotor lamination may further define a triangular-shaped pocket and may further include a first stamped sheet of a material different than the first stamped rotor lamination coplanar with and joined to the first stamped rotor lamination to define a vertex portion of the triangular-shaped pocket that has a mechanical strength greater than the first stamped rotor lamination. The rotor may further include a first stamped sheet of a material different than the first stamped rotor lamination coplanar with and joined to the first stamped rotor lamination to define a center bridge between the magnet pockets that has a magnetic permeability less than, and a mechanical strength greater than, the first stamped rotor lamination. The center bridge may be anchor-shaped. A material of the first stamped rotor lamination may be one of electrical steel or silicon steel and the material of the stamped ring may be one of a non-ferromagnetic metal or a non-ferromagnetic alloy.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be used in particular applications or implementations.

Figure 1A:
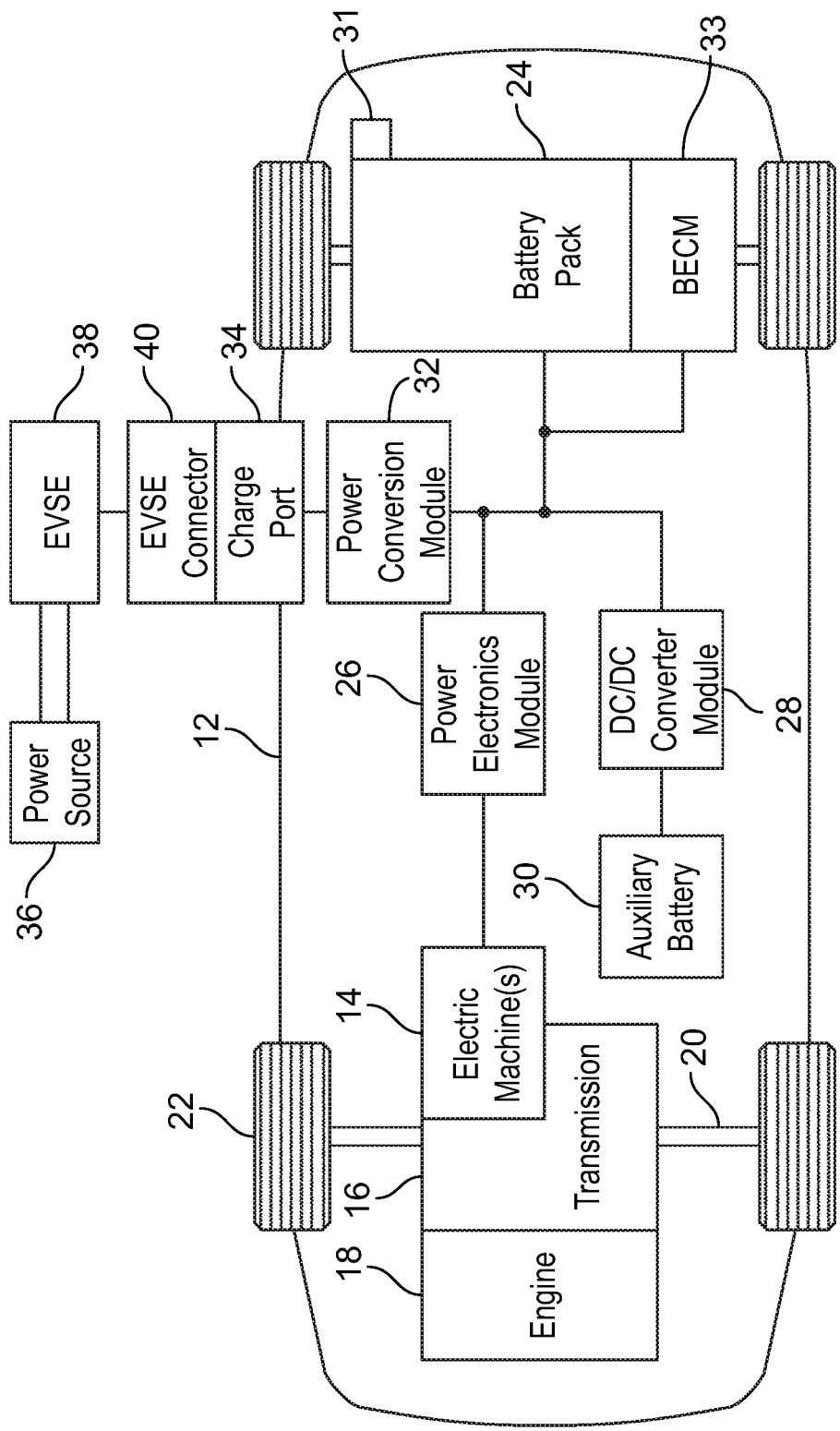
FIG. 1A is a schematic diagram illustrating an example of an electrified vehicle.

FIG. 1A illustrates a schematic representation of an example of an electrified vehicle. In this example, the electrified vehicle is a PHEV referred to as a vehicle 12 herein. The vehicle 12 may include one or more electric machines 14 mechanically connected to a hybrid transmission 16. Each of the electric machines 14 may be capable of operating as a motor or a generator. In addition, the hybrid transmission 16 is mechanically connected to an engine 18. The hybrid transmission 16 is also mechanically connected to a drive shaft 20 that is mechanically connected to wheels 22. The electric machines 14 can provide propulsion and deceleration capability when the engine 18 is turned on or off. The electric machines 14 may also operate as generators and provide fuel economy benefits by recovering energy that would normally be lost as heat in the friction braking system. The electric machines 14 may also provide reduced pollutant emissions since the vehicle 12 may be operated in electric mode under certain conditions.

A traction battery 24 stores energy that can be used by the electric machines 14. The traction battery 24 typically provides a high voltage DC output from one or more battery cell arrays, sometimes referred to as battery cell stacks, within the traction battery 24. The battery cell arrays may include one or more battery cells. The traction battery 24 is electrically connected to one or more power electronics modules 26 through one or more contactors (not shown). The one or more contactors isolate the traction battery 24 from other components when opened and connects the traction battery 24 to other components when closed. The power electronics module 26 is also electrically connected to the electric machines 14 and provides the ability to bi-directionally transfer electrical energy between the traction battery 24 and the electric machines 14. For example, a typical traction battery 24 may provide a DC voltage while the electric machines 14 may require a three-phase AC voltage to function. The power electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. Portions of the description herein are equally applicable to a pure electric vehicle. For a pure electric vehicle, the hybrid transmission 16 may be a gear box connected to an electric machine 14 and the engine 18 is not present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle loads. Other high-voltage loads, such as compressors and electric heaters, may be connected directly to the high-voltage without the use of a DC/DC converter module 28. In a typical vehicle, the low-voltage systems are electrically connected to an auxiliary battery 30 (e.g., a twelve-volt battery).

A battery electrical control module (BECM) 33 may be in communication with the traction battery 24. The BECM 33 may act as a controller for the traction battery 24 and may also include an electronic monitoring system that manages temperature and charge state of each battery cell of the traction battery 24. The traction battery 24 may have a temperature sensor 31 such as a thermistor or other temperature gauge. The temperature sensor 31 may be in communication with the BECM 33 to provide temperature data regarding the traction battery 24.

The vehicle 12 may be recharged by an external power source 36 such as an electrical outlet. The external power source 36 may be electrically connected to an electric vehicle supply equipment (EVSE) 38. The EVSE 38 may provide circuitry and controls to regulate and manage the transfer of electrical energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The charge connector 40 may have pins that mate with corresponding recesses of the charge port 34.

The various components discussed above may have one or more associated controllers to control and monitor the operation of the components. The controllers may communicate via a serial bus (e.g., a controller area network (CAN)) or via discrete conductors.

Figure 1B:
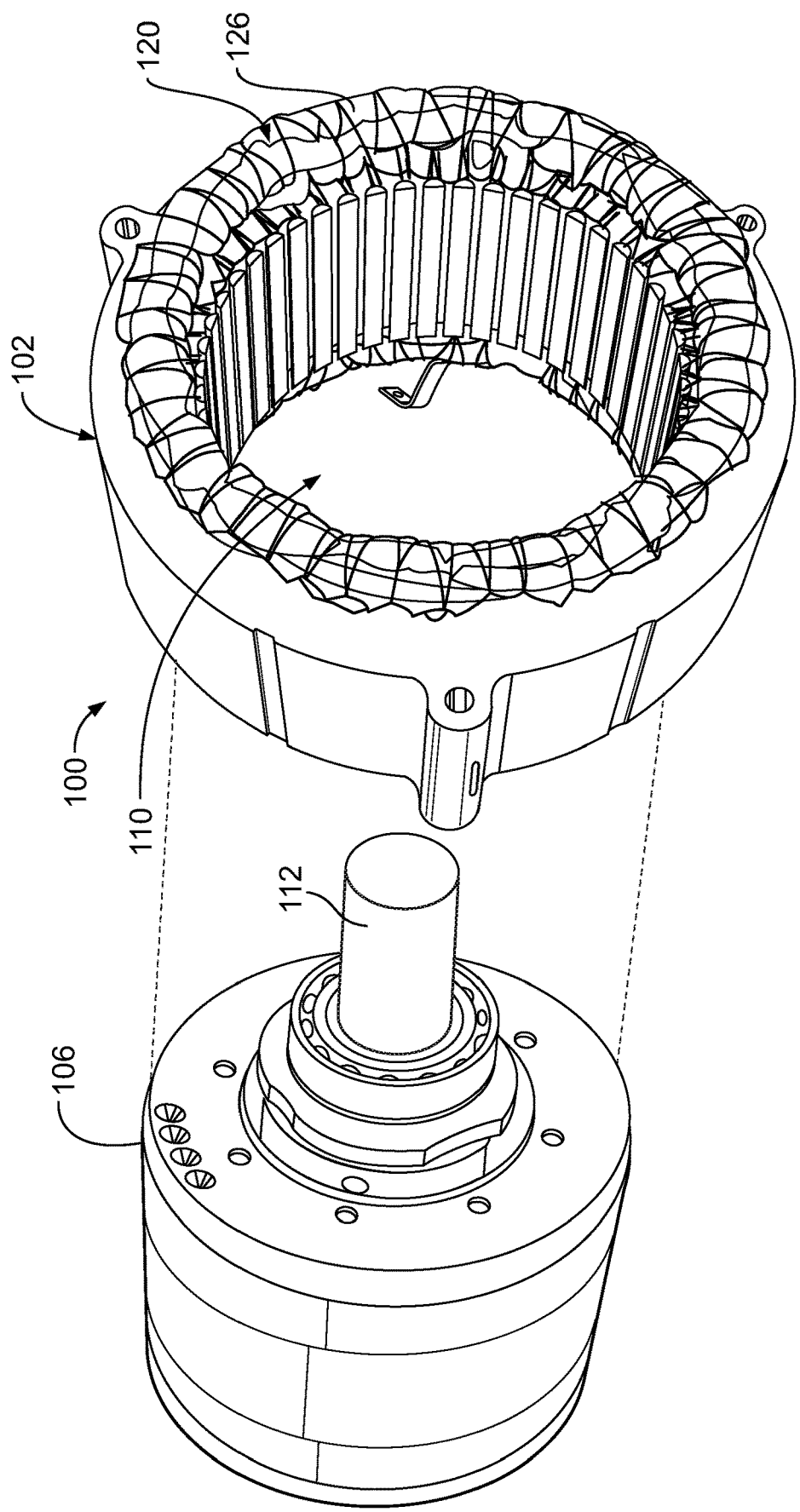
FIG. 1B is a perspective, partially exploded view of an example of a portion of a vehicle electric machine.

FIG. 1B is a partially exploded view illustrating an example of portions of an electric machine assembly for an electrified vehicle, referred to generally as an electric machine 100 herein. The electric machine 100 may include a stator core 102 and a rotor 106. As mentioned above, electrified vehicles may include more than one electric machine. In an example with two electric machines, one of the electric machines may function primarily as a motor and the other may function primarily as a generator. The motor may operate to convert electricity to mechanical power and the generator may operate to convert mechanical power to electricity. The stator core 102 may define a cavity 110. The rotor 106 may be sized for disposal and operation within the cavity 110. A shaft 112 may be operably connected to the rotor 106 and may be coupled to other vehicle components to transfer mechanical power therefrom.

Windings 120 may be disposed within the cavity 110 of the stator core 102. In an electric machine motor example, current may be fed to the windings 120 to obtain a rotational force on the rotor 106. In an electric machine generator example, current generated in the windings 120 by a rotation of the rotor 106 may be used to power vehicle components. Portions of the windings 120, such as end windings 126, may protrude from the cavity 110. During operation of the electric machine 100, heat may be generated along the windings 120 and end windings 126. The rotor 106 may include magnets such that rotation of the rotor 106 in cooperation with an electric current running through the end windings 126 generates one or more magnetic fields. For example, electric current running through the end windings 126 generates a rotating magnetic field. Magnets of the rotor 106 will magnetize and rotate with the rotating magnetic field to rotate the shaft 112 for mechanical power.

Figure 2:
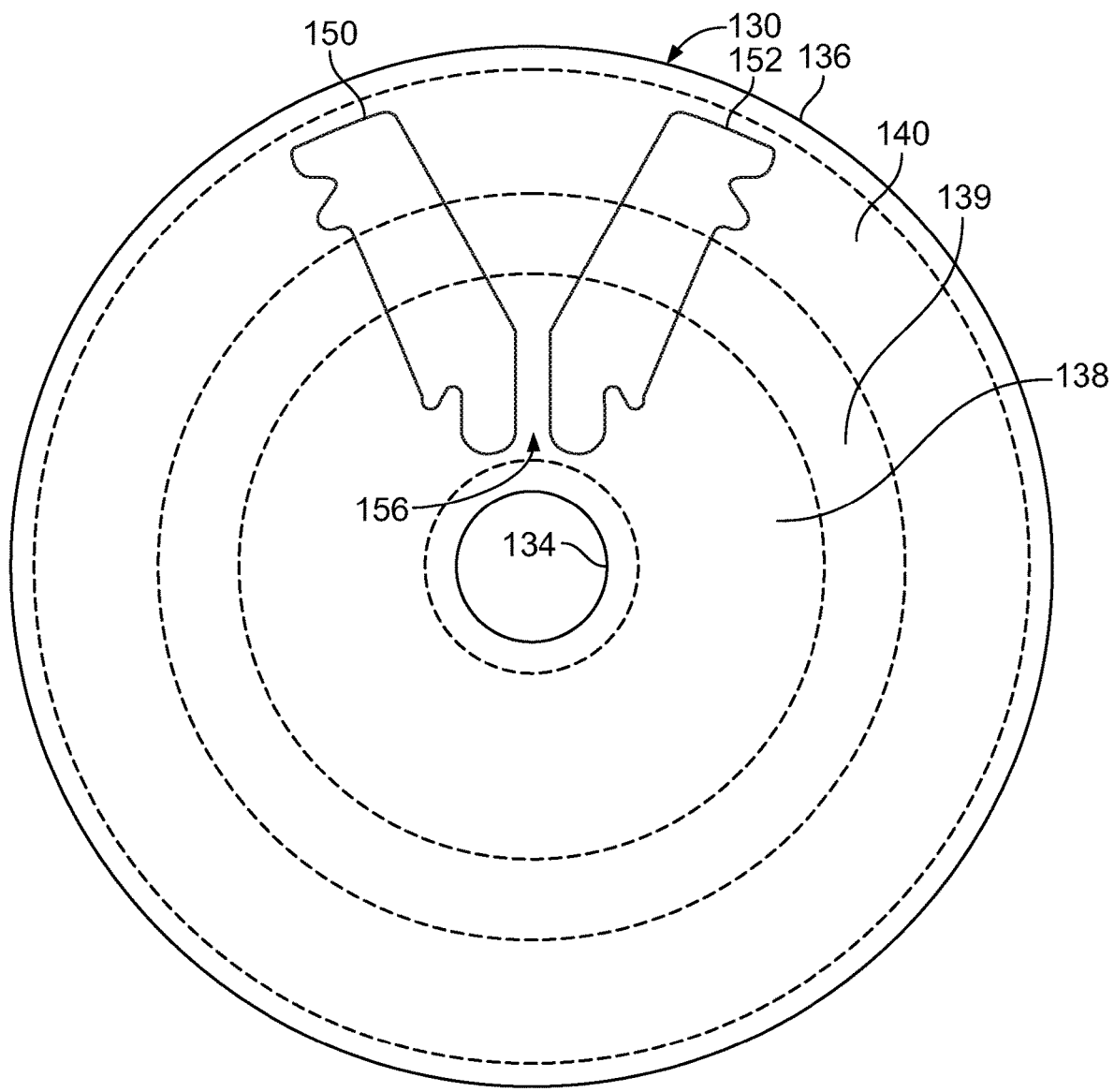
FIG. 2 is a top plan view of an example of a rotor illustrating different rotor regions.

FIG. 2 is an illustrative top plan view of an example of a rotor of a vehicle electric machine, referred to as a rotor 130. The rotor 130 includes a central through-hole 134 sized to receive a shaft (not shown), such as the shaft 112 described above, and an outer surface 136. The rotor 130 further includes an inner region 138, a middle region 139, and an outer region 140.

The inner region 138 is located adjacent the central through-hole 134 and extends radially thereabout. An inner edge of the inner region 138 may be spaced from the central through-hole 134. The outer region 140 is located adjacent the outer surface 136 and extends radially about the central through-hole 134, the inner region 138, and the middle region 139. Openings or cutouts within the regions may provide locations for mounting components and also provide reduced weight benefits.

For example, the rotor 130 may include pairs of pockets spaced radially about the central through-hole 134 such as a first pocket 150 and a second pocket 152. In this example, each of the first pocket 150 and the second pocket 152 extend from the outer region 140 to the inner region 138, however, it is contemplated that the first pocket 150 and the second pocket 152 may extend within a single rotor region or only two of the rotor regions. Each of the first pocket 150 and the second pocket 152 may be sized to receive a magnet therein. The first pocket 150 and the second pocket 152 may be spaced from one another to define a bridge 156 therebetween. While only one pair of pockets is shown in FIG. 2, it is contemplated that the rotor 130 may include a plurality of pairs of pockets spaced radially about the central through-hole 134.

During electric machine operation involving a rotation of the rotor 130, portions of the rotor 130 may experience performance challenges. The portions of the rotor 130 experiencing the performance challenges may be targeted to have a material suitable to withstanding the performance challenges. For example, the portions of the rotor 130 experiencing performance challenges may be of a material having a suppressed magnetic permeability, an increased mechanical strength, characteristics to reduce core losses, or an increased flux density as further described herein.

FIGS. 3 through 8 illustrate examples of portions of electric machine rotors or vehicle electric machine stators experiencing stress during vehicle operation. FIGS. 9 through 12 illustrate examples of rotor and stator designs which may address the experienced stresses and further illustrate an example of a fabrication method to build the rotor and stator designs. While FIGS. 9 through 12 focus on components of vehicle electric machines, it is contemplated that other electric machines which may experience similar stresses may utilize concepts described herein for building the other components.

Figure 3:
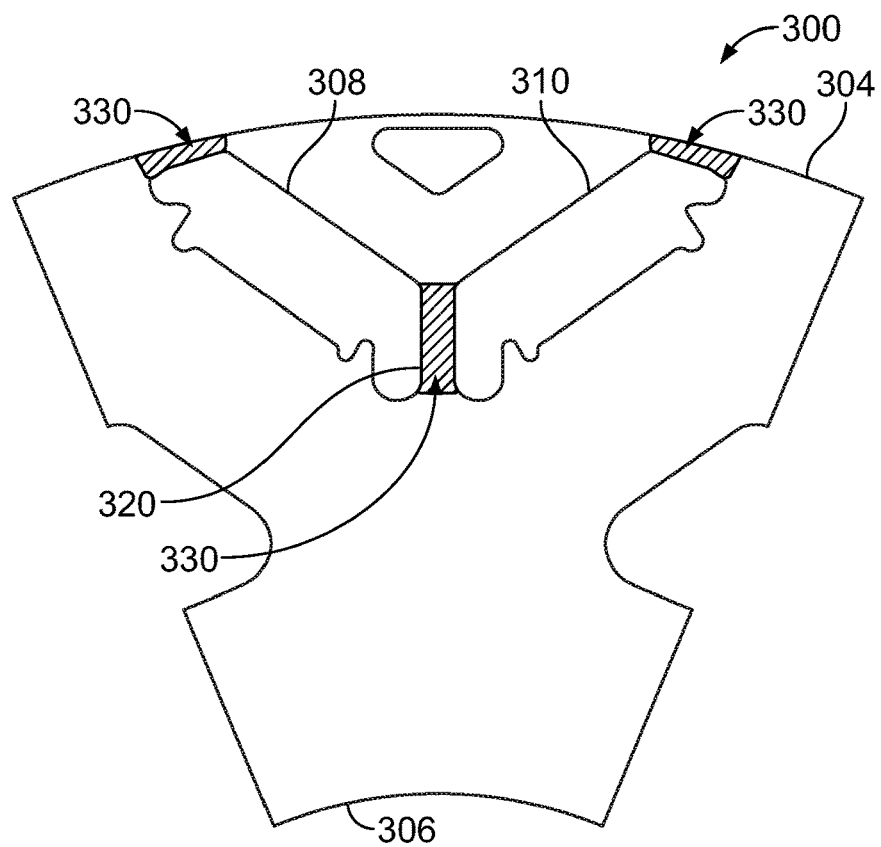
FIG. 3 is a top plan view of an example of a portion of a rotor for an electric machine showing regions of the rotor for suppression of magnetic permeability.

FIG. 3 is a partial top plan view illustrating an example of a portion of a vehicle electric machine rotor, referred to generally as a rotor 300. The rotor 300 includes an outer surface 304 and a central through-hole 306. The rotor 300 may be formed to define a first pocket 308 and a second pocket 310. Each of the first pocket 308 and the second pocket 310 may be sized to receive a magnet therein. While the rotor 300 is shown with one pair of pockets in FIG. 3, it is to be understood that the rotor 300 may have multiple pairs of pockets spaced radially about the central through-hole 306. The first pocket 308 and the second pocket 310 are spaced from one another to define a bridge 320 therebetween.

In this example, the rotor 300 may be formed from a blank or sheet of a homogeneous material, such as electrical steel or silicon steel, which is processed through hot rolling, annealing, and cold rolling. Rotor sheets may then be die punched and subsequently stacked with one another. Due to the homogeneous material, property characteristics of different regions of the rotor 300 are identical. However, operation of the rotor 300 within an electric machine assembly may operate more efficiently if materials of the different regions of the rotor 300 are tailored to perform optimally based on a type of stress received at a particular region. Regions 330 represent portions of the rotor 300 in which a suppressed magnetic permeability may be desired.

For example, the regions 330 are located at the bridge 320 and at regions located adjacent the outer surface 304 spaced outward from a respective pocket. The regions 330 are examples of portions of the rotor 300 where reduced magnetic permeability assists in reducing flux leakage while increasing torque density during operation of the rotor 300 (e.g., rotor 300 rotation during operation of a vehicle). In this example, it may be beneficial to utilize a non-ferromagnetic austenite stainless steel sheet with a high chromium content, such as 304L stainless steel or 316L stainless steel, or other non-ferromagnetic metal or alloy, for the regions 330.

Figure 4:
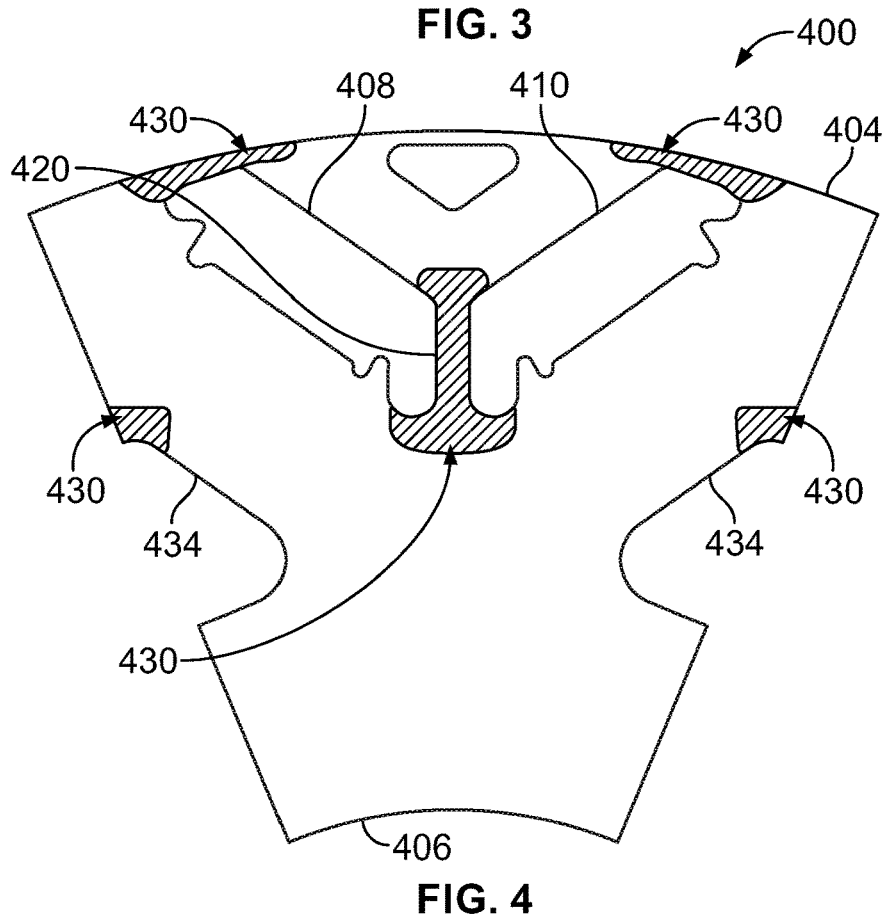
FIG. 4 is a top plan view, of an example of a portion of a rotor for an electric machine showing regions of the rotor that may experience high stress due to centrifugal force generated by rotor rotation.

FIG. 4 is a partial top plan view illustrating an example of a portion of a vehicle electric machine rotor, referred to generally as a rotor 400. The rotor 400 includes an outer surface 404 and a central through-hole 406. The rotor 400 may be formed to define a first pocket 408 and a second pocket 410. Each of the first pocket 408 and the second pocket 410 may be sized to receive a magnet therein. While the rotor 400 is shown with one pair of pockets in FIG. 4, it is to be understood that the rotor 400 may have multiple pairs of pockets spaced radially about the central through-hole 406. The first pocket 408 and the second pocket 410 are spaced from one another to define a bridge 420 therebetween.

In this example, the rotor 400 may be formed from a blank or sheet of a homogeneous material which is processed through hot rolling, annealing, and cold rolling. Rotor sheets may then be die punched and subsequently stacked with one another. Due to the homogeneous material, property characteristics of different regions of the rotor 400 are identical. However, operation of the rotor 400 within an electric machine assembly may operate more efficiently if materials of the different regions of the rotor 400 are tailored to perform optimally based on a type of stress received by a particular region.

A system including increased rotor rotation is one option to assist in reducing a motor/generator size. Regions 430 represent portions of the rotor 400 in which mechanical stresses above a predetermined threshold are experienced during rotation or increased rotation of the rotor 400. In one example, the predetermined threshold may be approximately 200 MPa. The regions 430 may be located at the bridge 420 and extend onto adjacent portions of the rotor 400 to define an anchor shape at regions located adjacent the outer surface 404 and above respective pockets, and at regions spaced outward relative to triangular-shaped cutouts 434 (only a portion of each triangular-shaped cutout 434 is shown in FIG. 4) located at a middle region of the rotor 400. In one example, a second sheet of a thallium (Ti) alloy and high strength steel may be formed to a size and shape substantially equal to each of the regions 430 for joining to the rotor 400.

Figure 5:
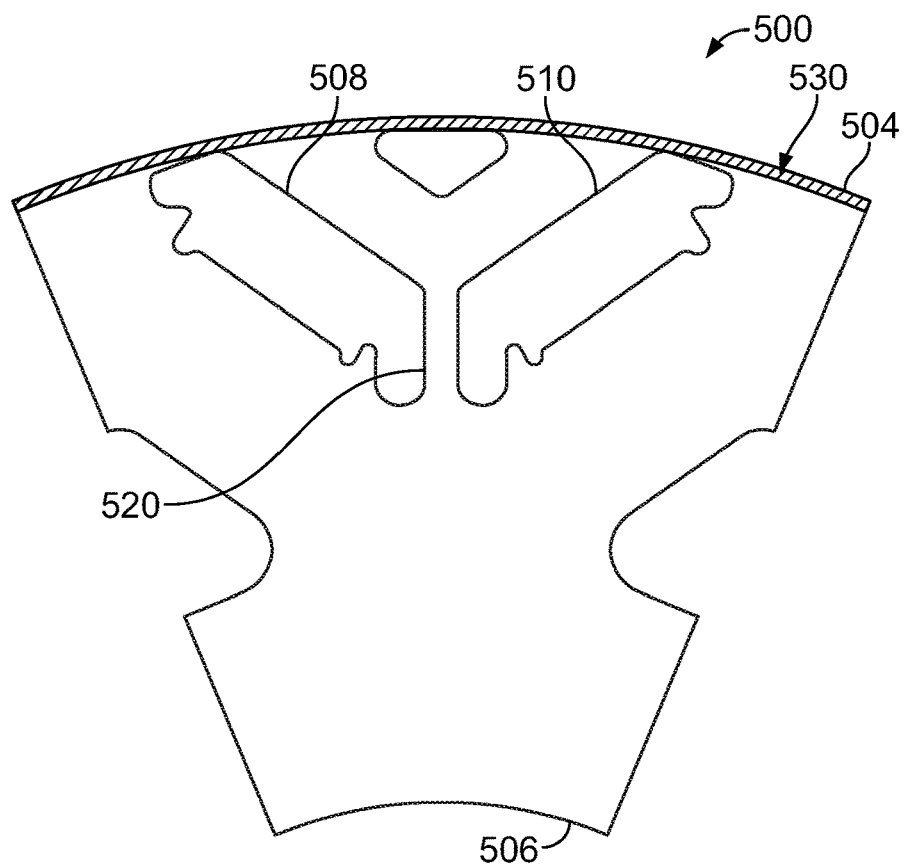
FIG. 5 is a top plan view of an example of a portion of a rotor for an electric machine showing regions of the rotor which may experience a high core loss during operation.
Figure 6:
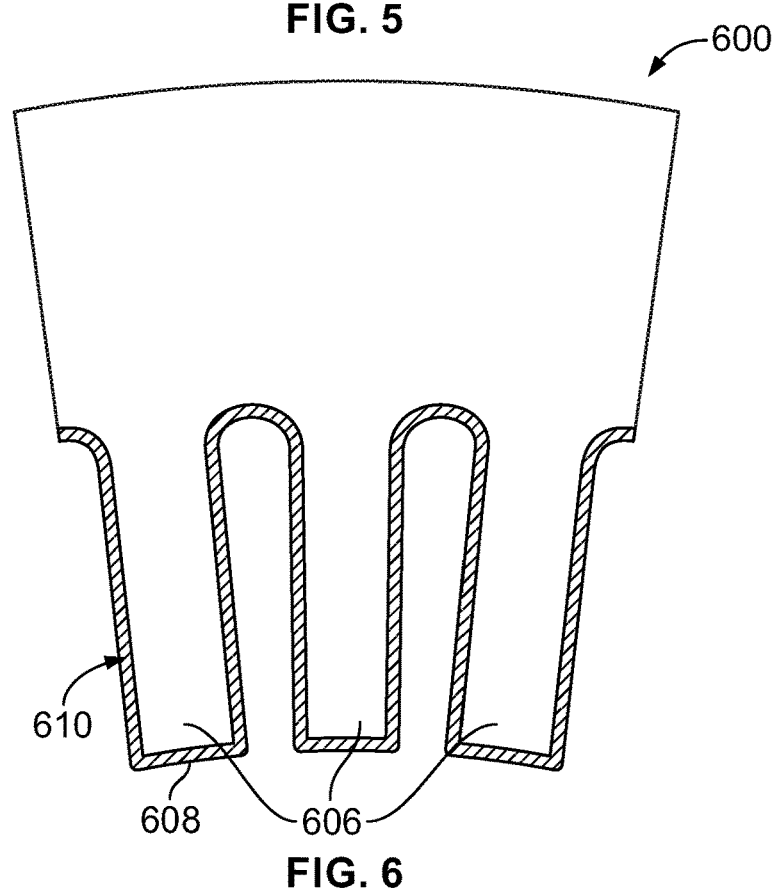
FIG. 6 is a top plan view of an example of a portion of a rotor for an electric machine showing regions of the rotor which may experience a high core loss during operation.

FIGS. 5 and 6 are partial views illustrating an example of portions of a vehicle electric machine assembly. FIG. 5 is a partial top plan view illustrating an example of a portion of a vehicle electric machine rotor, referred to generally as a rotor 500. The rotor 500 includes an outer surface 504 and a central through-hole 506. The rotor 500 may be formed to define a first pocket 508 and a second pocket 510. Each of the first pocket 508 and the second pocket 510 may be sized to receive a magnet. While the rotor 500 is shown with one pair of pockets in FIG. 5, it is to be understood that the rotor 500 may have multiple pairs of pockets spaced radially about the central through-hole 506. The first pocket 508 and the second pocket 510 are spaced from one another to define a bridge 520 therebetween.

In this example, the rotor 500 may be formed from a blank or sheet of a homogeneous material which is processed through hot rolling, annealing, and cold rolling. The rotor sheets may then be die punched and subsequently stacked with one another. Due to the homogeneous material, property characteristics of different regions of the rotor 500 are identical. However, operation of the rotor 500 within an electric machine assembly may operate more efficiently if materials of the different regions of the rotor 500 are tailored to perform optimally based on a type of stress received by a particular region. Portions of the rotor 500 may experience core loss during operation. Core loss is a loss that occurs in a magnetic core due to alternating magnetization and negatively impacts electric machine performance. For example, a region 530 may experience a higher amount of core loss during operation in comparison to other portions of the rotor 500. In this example, the region 530 is a portion of the rotor 500 that extends about a perimeter of the rotor 500 at the outer surface 504.

FIG. 6 is a partial top plan view, illustrating an example of a portion of a vehicle electric machine stator, referred to generally as a stator 600. The stator 600 includes a plurality of teeth 606 spaced radially about a central through-hole 608. A portion of the stator 600, referred to as a portion 610, extending along an outline of the teeth 606 may see a significant amount of core loss during operation. Utilizing techniques described herein, the stator 600 may be formed such that the portion 610 may be of a material different than other portions of the stator 600. In one example, the portion 610 may be of a material including iron-silicon (FeSi) with an Si content up to 6.5%.

The stator 600 may be formed by stacking a plurality of sheets of material with one another. For example, each of a plurality of first sheets may be punched via a die assembly to form the teeth 606. Each of the plurality of first sheets may be further punched via the die assembly to cut out the portion 610. Each of a plurality of second sheets, such as a sheet of FeSi, may be shaped to a size substantially equal to a size of the portion 610. Each of the plurality of second sheets may then be joined to one of the plurality of first sheets to create a stator sheet. In one example, portions of the die assembly punching the sheets may include an angled portion such that each of the plurality of first sheets and each of the plurality of second sheets are punched to form angled portions to facilitate joining with one another as further described herein. Multiple stator sheets may then be stacked with one another to create a finished stator.

Figure 7:
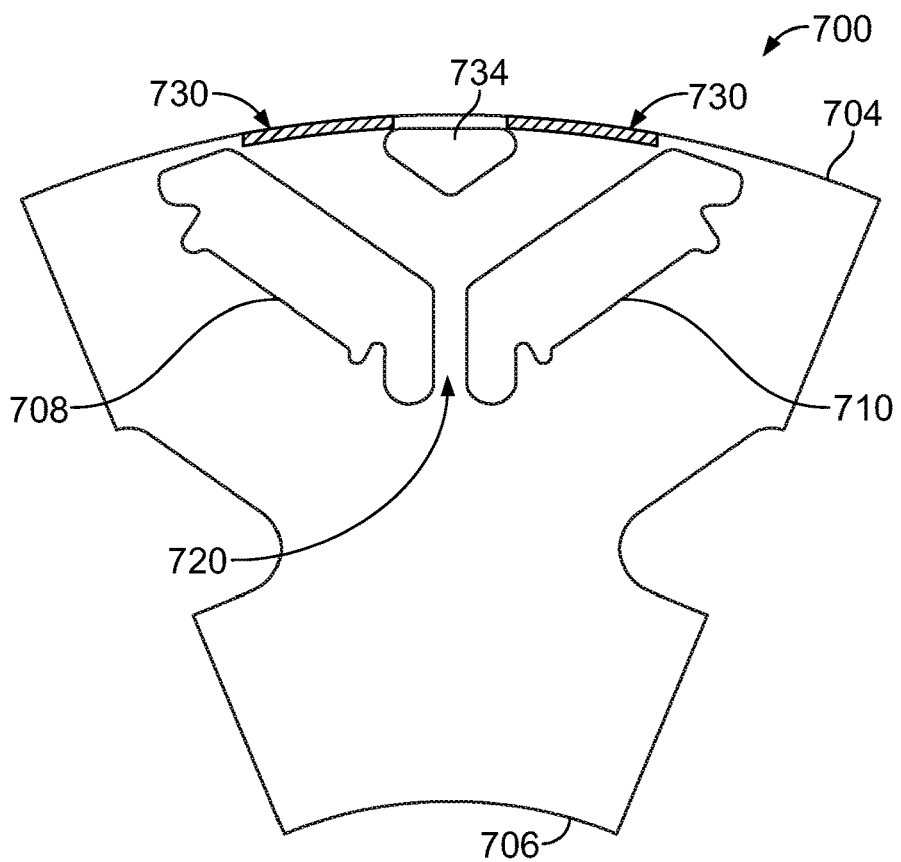
FIG. 7 is a top plan view of an example of a portion of a rotor for an electric machine showing regions of the rotor where an enhancement of magnetic flux density may be desired.
Figure 8:
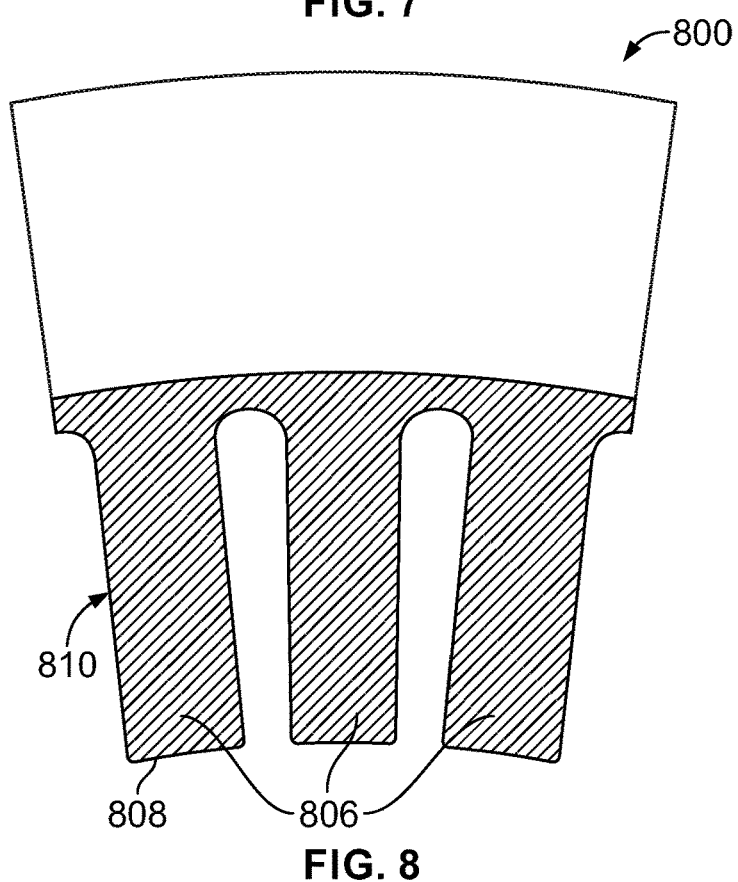
FIG. 8 is a top plan view of an example of a portion of a rotor for an electric machine showing regions of the rotor where an enhancement of magnetic flux density may be desired.

FIGS. 7 and 8 are partial views illustrating an example of portions of a vehicle electric machine assembly. FIG. 7 is a partial top plan view illustrating an example of a portion of a vehicle electric machine rotor, referred to generally as a rotor 700. The rotor 700 includes an outer surface 704 and a central through-hole 706. The rotor 700 may be formed to define a first pocket 708 and a second pocket 710. Each of the first pocket 708 and the second pocket 710 may be sized to receive a magnet. While the rotor 700 is shown with one pair of pockets in FIG. 7, it is to be understood that the rotor 700 may have multiple pairs of pockets spaced radially about the central through-hole 706. The first pocket 708 and the second pocket 710 are spaced from one another to define a bridge 720 therebetween.

In this example, the rotor 700 may be formed from a blank of a homogeneous material which is processed through hot rolling, annealing, and cold rolling. Rotor sheets may then be die punched and subsequently stacked with one another. Due to the homogeneous material, property characteristics of different regions of the rotor 700 are identical. However, operation of the rotor 700 within an electric machine assembly may operate more efficiently if materials of the different regions of the rotor 700 are tailored to perform optimally based on a type of stress received by a particular region of the rotor 700. Regions 730 represent portions of the rotor 700 in which an increased flux density may enhance performance during operation of an electric machine assembly including the rotor 700. Each of the regions 730 is located at or adjacent to the outer surface 704, located between an outer end of the first pocket 708 and an outer end of the second pocket 710, and on either side of an outer triangular-shaped pocket 734.

FIG. 8 is a partial top plan view, illustrating an example of a portion of a vehicle electric machine stator, referred to generally as a stator 800. The stator 800 includes a plurality of teeth 806 spaced radially about a central through-hole 808. A portion of the stator 800, referred to as a portion 810, may comprise the teeth 806 and may require an amount of magnetic flux density higher than that available with a typical material used to create stators. Thus, the stator 800 may be formed such that the portion 810 or the teeth 806 may be of a material different than other portions of the stator 800. In one example, the portion 810 or the teeth 806 may be of a material including ferromagnetic properties with high flux density such as an alloy including iron and cobalt (FeCo).

The stator 800 may be formed by stacking a plurality of sheets of material with one another. For example, each of a plurality of first sheets may be punched via a die assembly to form the teeth 806. Each of the plurality of first sheets may be further punched via the die assembly to cut out the portion 810. Each of a plurality of second sheets, such as a sheet of ferromagnetic material, may be shaped to a size substantially equal to a size of the portion 810. Each of the plurality of second sheets may then be joined to one of the plurality of first sheets to create a stator sheet. In one example, portions of the die assembly punching the sheets may include an angled portion such that each of the plurality of first sheets and each of the plurality of second sheets are punched to form an angled portion to facilitate joining with one another as further described herein. Multiple stator sheets may then be stacked with one another to create a finished stator component.

Alternatively, each of the plurality of first sheets of a first material may be punched via a die assembly to form an outer ring of the stator 800. Then, each of the plurality of second sheets of a second material may be punched to define the teeth 806 and/or the portion 810. Lastly, each of the outer rings may be joined with one of the portions 810 to create a finished stator component.

Figure 9:
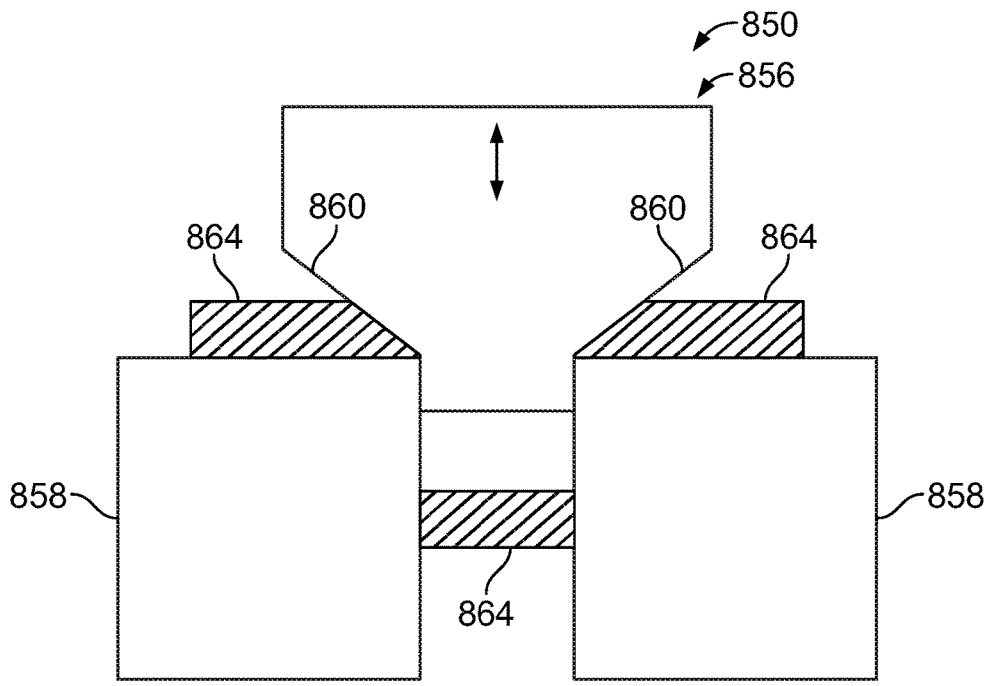
FIG. 9 is an illustrative view of an example of a portion of a vehicle component fabrication process including a die assembly.

FIGS. 9 and 10A through 10G illustrate further detail relating to the punching and joining operations described above. FIG. 9 is an illustrative view of a portion of a die assembly, referred to generally as a die assembly 850 herein. The die assembly 850 may include a punch member 856 arranged for at least partial vertical translation between and above two base die elements 858. The punch member 856 may include a pair of angle portions 860. A first sheet 864 may be positioned between the punch member 856 and the two base die elements 858 to receive a punch to separate the first sheet 864 into multiple components as shown in FIG. 9. Each of the pair of angle portions 860 of the punch member 856 may form an angled portion or angled edge of the first sheet 864 when punched.

Figure 10A:
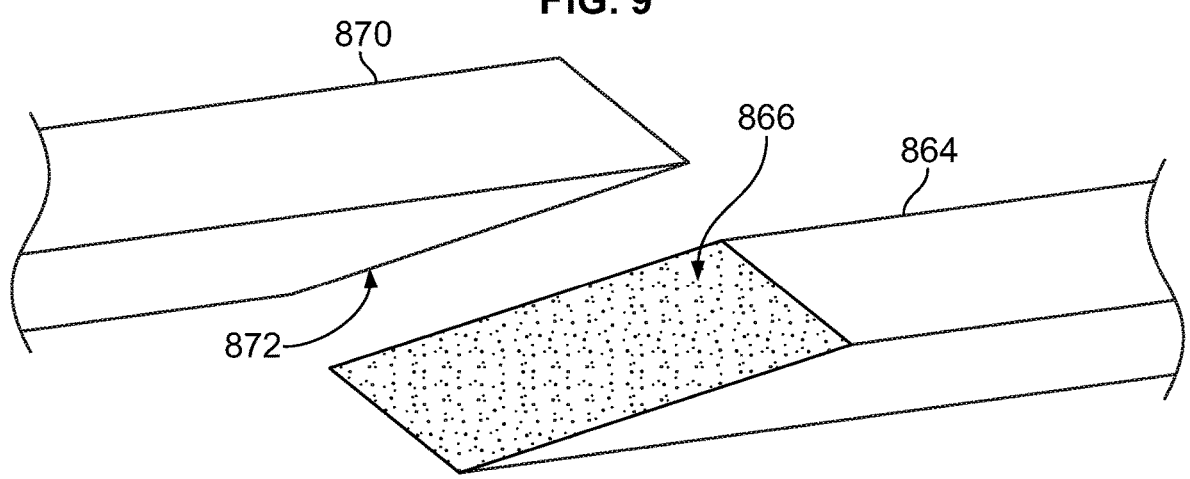
FIGS. 10A and 10B are perspective views illustrating examples of joining regions for sheets of an electric machine rotor or stator.
Figure 10B:
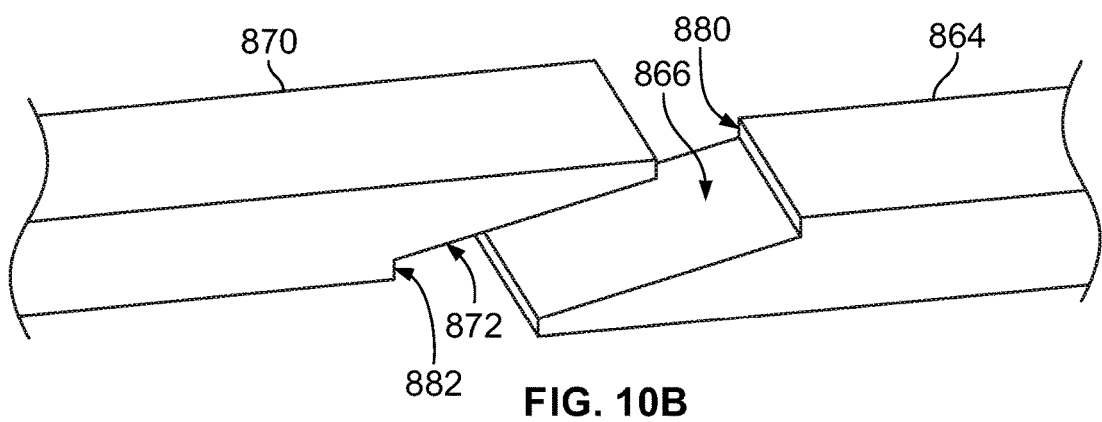

FIGS. 10A and 10B illustrate examples of two sheets of material following separate punch operations in which a die assembly includes angled portions on a punch member, such as the pair of angle portions 860 of the punch member 856. In this example, the first sheet 864 is shown following a punch operation in which a first angle region 866 is formed and a second sheet 870 is shown following a punch operation in which a second angle region 872 is formed. The pair of angle portions 860 of the punch member 856 may be sized such that the formed first angle region 866 and the second angle region 872 correspond to one another to facilitate a joining operation, such as welding. Each of the first angle region 866 and the second angle region 872 may define a wedge-shaped cross-sectional profile. The wedge-shaped cross-sectional profiles may assist in facilitating a scarf joining process to join the first sheet 864 and the second sheet 870 to one another. In one example, the first sheet 864 and the second sheet 870 may be joined with one another via ultrasonic seam welding or ultrasonic additive manufacturing.

FIG. 10B illustrates further detail of an example of the two sheets of material following separate punch operations. In this example, the die assembly includes punch members to define a first ledge 880 of the first sheet 864 at one end of the first angle region 866 and a second ledge 882 of the second sheet 870 at one end of the second angle region 872. The first ledge 880 and the second ledge 882 assist in providing a strong bonding between the first sheet 864 and the second sheet 870 and further assists in minimizing a sliding movement of each of the sheets.

FIGS. 10C through 10G are side views illustrating additional examples of joining regions of two sheets to facilitate strong bonding between the sheets and a minimization of sliding movement between the two sheets. It is to be noted that a die assembly forming each of the sheets would include an appropriately shaped punch member to form the joining regions.

Figure 10C:
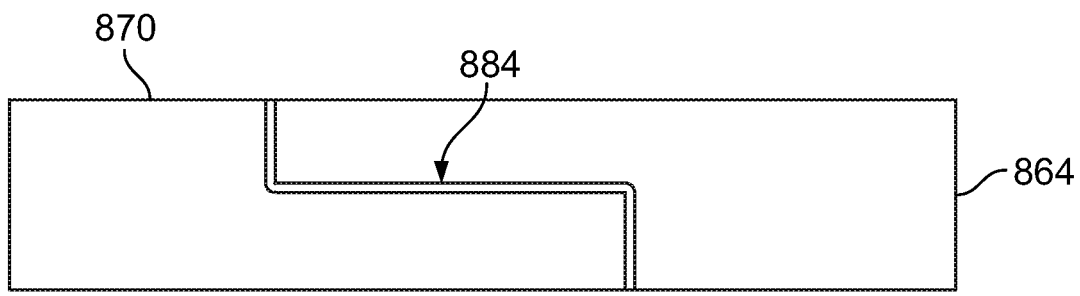
FIGS. 10C through 10G are illustrative side views, in cross-section, of examples of portions of two sheets formed via the vehicle component fabrication process.
Figure 10D:
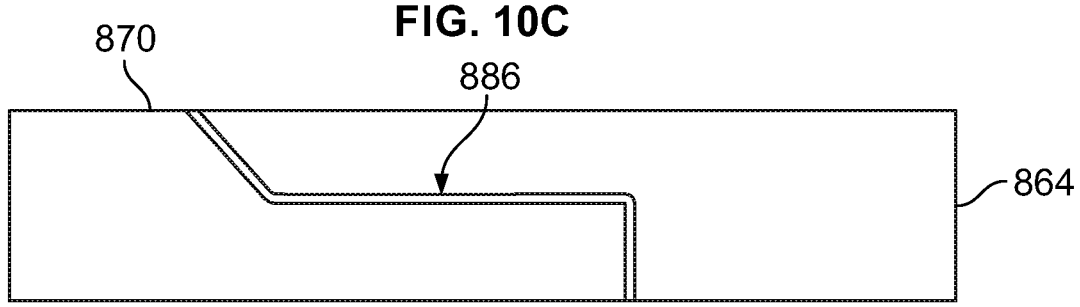
Figure 10E:
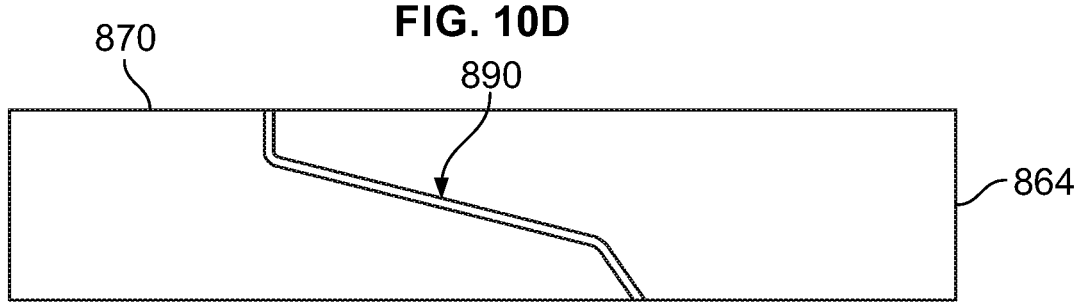
Figure 10F:
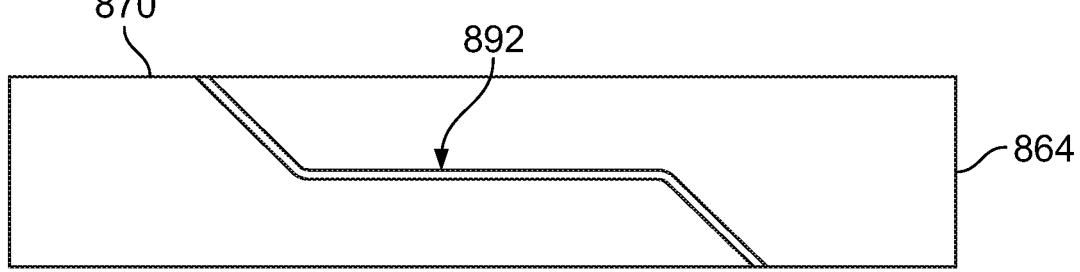
Figure 10G:
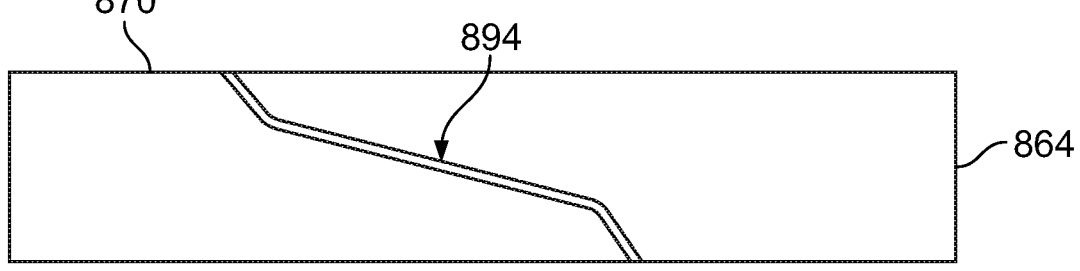

In FIG. 10C, a joining region 884 is defined by substantially right angles of ends of each of the two sheets and a substantially horizontal surface therebetween. In FIG. 10D, a joining region 886 is defined by one substantially right-angle end and one angle end between zero and ninety degrees. A substantially horizontal surface extends between the substantially right-angle end and the angle end between zero and ninety degrees. In FIG. 10E, a joining region 890 is defined one substantially right-angle end and one angle end between zero and ninety degrees. An angled surface extends between the substantially right-angle end and the angle end between zero and ninety degrees. In FIG. 10F, a joining region 892 is defined by a first angle end of between twenty and seventy degrees and a corresponding second angle end of between twenty and seventy degrees. A substantially horizontal surface extends between the first angle end and the second angle end. In FIG. 10G, a joining region 894 is defined by a third angle end and a fourth angle end. An angled surface extends between the third angle end and a fourth angle end. In one example, the third angle end and the fourth angle end may be of corresponding angles between twenty and seventy degrees.

Figure 11:
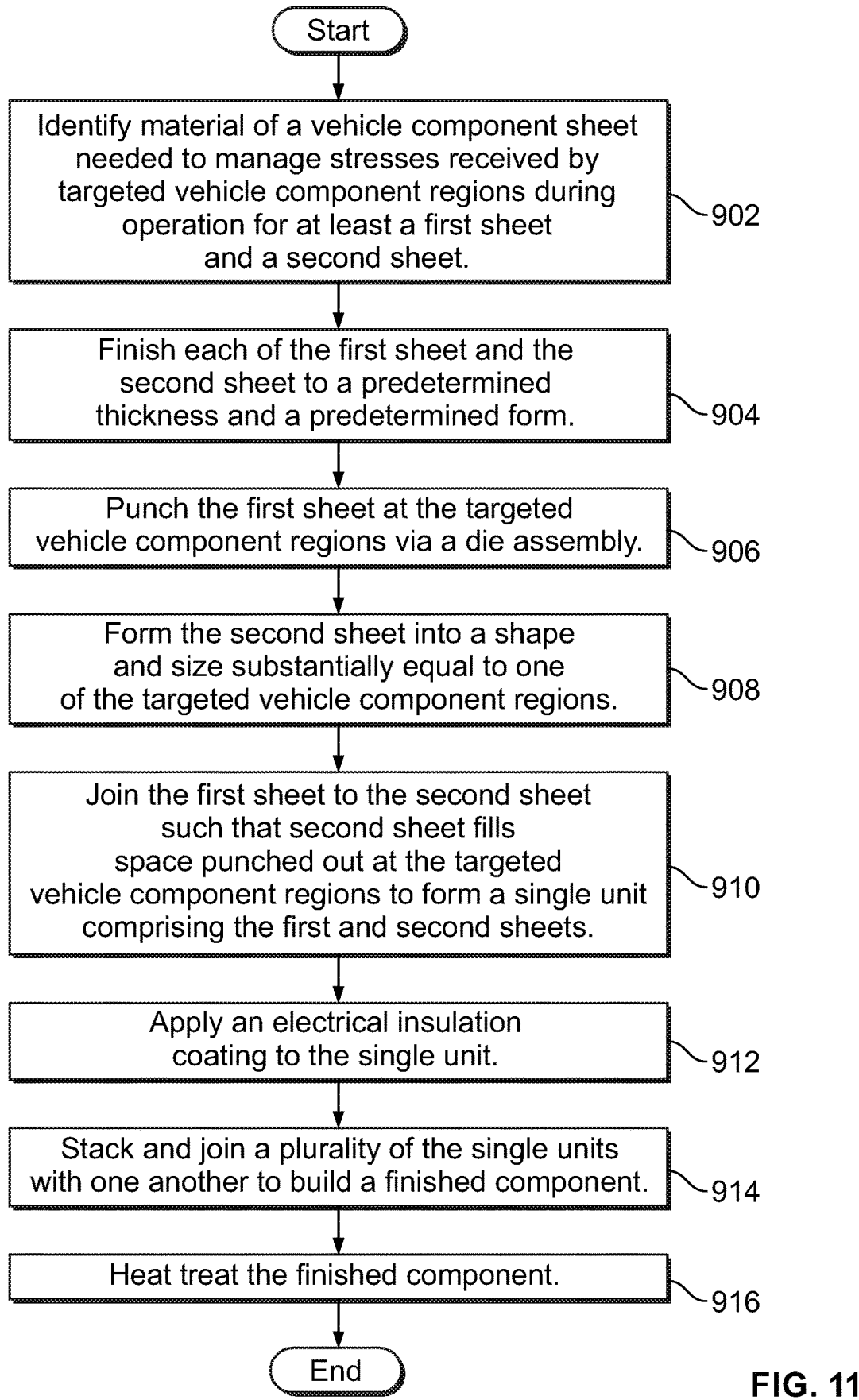
FIG. 11 is a flow chart illustrating an example of a fabrication process of a vehicle component.

FIG. 11 is a flow chart illustrating an example of a fabrication method to create a component with more than one material, referred to generally as a fabrication method 900 herein. Execution of the fabrication method 900 may create a vehicle component, such as a rotor or stator, having portions of varied materials selected to withstand specific performance challenges at targeted component locations as described herein.

In operation 902, material for a first sheet and a second sheet of the vehicle component may be identified based on performance challenges which will be experienced by targeted component regions during operation of the vehicle component. The targeted component regions of a rotor or stator include regions in which the component may experience flux leakage, high mechanical stresses, or high core losses during operation. Examples of the target component regions include region 330, region 430, region 530, portion 610, region 730, and portion 810 as described above or other regions experiencing operational performance challenges.

Examples of material for selection may include electrical steel, FeSi with high silicon content, non-ferromagnetic metal and non-ferromagnetic alloy, ultra-high strength metal alloy, and FeCo.

In operation 904, each of the first sheet and the second sheet may be finished to a predetermined thickness and a desired form. In one example, each of the sheets may be finished to create a predetermined thickness less than one millimeter, and each sheet may be formed to define a component shape of a portion or all of the vehicle component.

In operation 906, the first sheet may be punched via a die assembly at one or more of the targeted component regions. For example, the first sheet may define a profile of a rotor and may be punched at one of the region 330, the region 430, the region 530, and the region 730 as described above. The die assembly may include a punch member including angle regions, such as the punch member 856 and the angle portions 860 described above. The first sheet may be arranged with the punch member such that a punch operation removes one or more of the targeted component regions from the first sheet while defining an edge or a portion of an edge of the first sheet including a first angle region, such as the first angle region 866.

In operation 908, the second sheet may be formed into a shape and size substantially equal to one of the targeted vehicle component regions just punched out. The second sheet may further be formed to have a second angle region corresponding to the first angle region of the first sheet as described in relation to operation 906. The second angle region of the second sheet may extend about a portion or all of a perimeter of the second sheet.

In operation 910, the first sheet and the second sheet may be joined with one another to form a single unit such that the second sheet fills space where the punch member punched the targeted vehicle component regions. For example, the first sheet and the second sheet may be welded together between the first angle region and the second angle region. Examples of weld processes which may be used include ultrasonic welding, diffusion welding, and magnetic pulse welding. It is contemplated that other solid-state welding methods may be used to join the first sheet with the second sheet to create seamless and filler free connections without creating weld lines.

Optionally, an electrical insulation coating may be applied to the single unit in operation 912. Examples of the electrical insulation coating may include organic and/or inorganic materials, such as a C5 coating. The aforementioned operations may be executed to create a plurality of single units. The plurality of single units may then be stacked and joined with one another to build a finished component in operation 914 and the finished component may be heat treated in operation 916.

Figure 12:
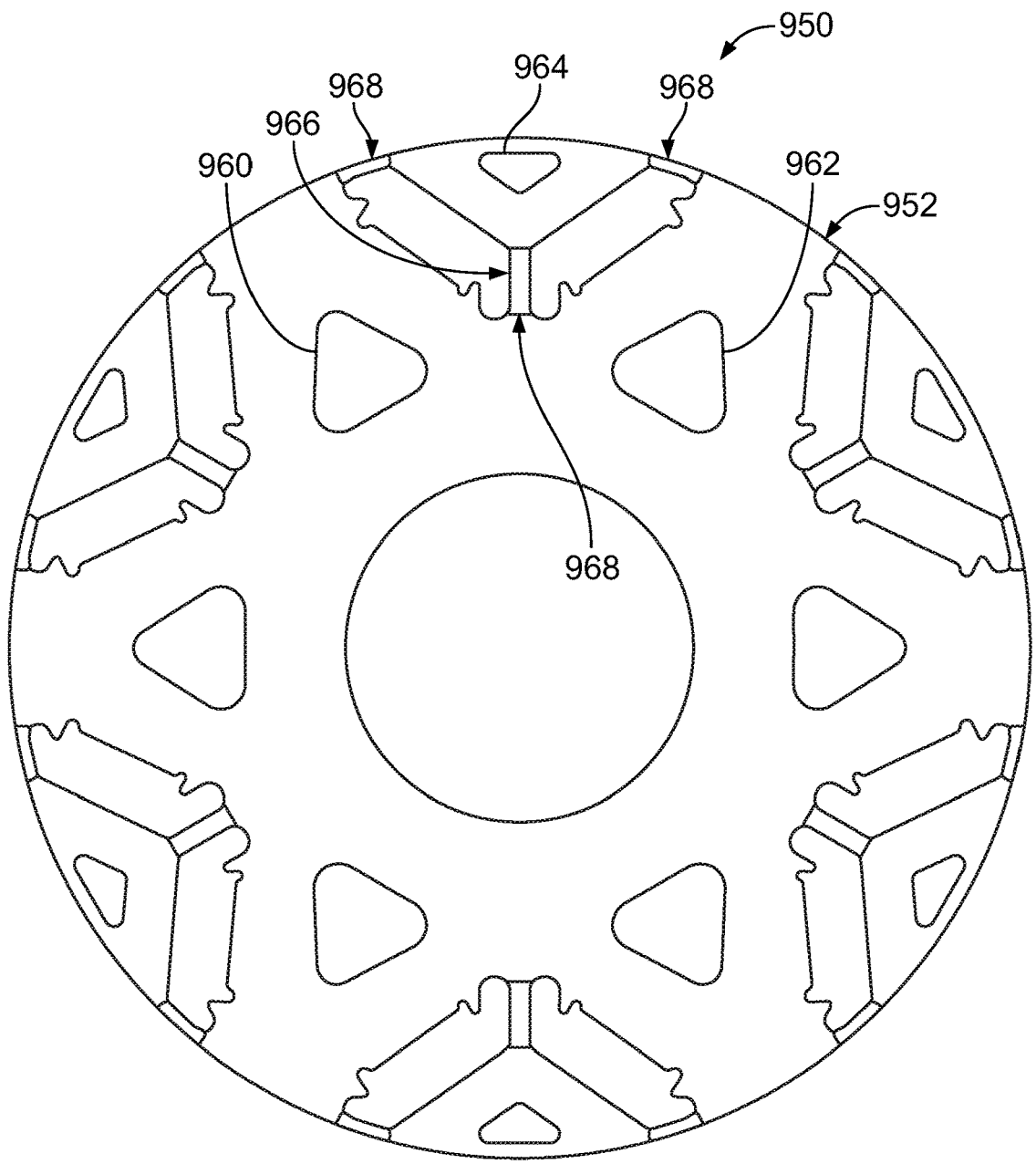
FIG. 12 is a top plan view of an example of a portion of a rotor fabricated using the vehicle component fabrication process described in relation to FIGS. 9 through 11.

FIG. 12 illustrates an example of a component, referred to as a rotor 950 herein. The rotor 950 may be formed with two sheets of different material via a fabrication method, such as the fabrication method 900. A first sheet 952 may be punched via a die assembly to define one or more through-holes. For example, the first sheet 952 may be punched to define a first magnet pocket 956, a second magnet pocket 958, a first triangular mid-pocket 960, a second triangular mid-pocket 962, and an outer triangular pocket 964. The first sheet may be of a material such as an electrical steel sheet or a silicon steel sheet. A bridge 966 may be defined between the first magnet pocket 956 and the second magnet pocket 958. Operational performance of the rotor 950, such as during rotation within a vehicle electric machine, may be improved by identifying target portions of the rotor 950 to have a selected material suited to address stresses received during operation.

Figure 13:
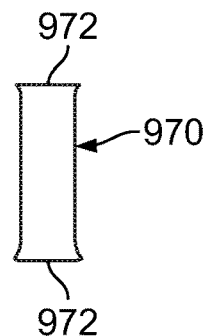
FIG. 13 is a top plan view of an example of a second sheet formed and sized to substantially equal a size of a bridge of the rotor of FIG. 12.

For example, regions 968 of the rotor 950 may be regions in which a suppressed magnetic permeability may be desired to assist in reducing flux leakage while increasing torque density during operation of the rotor 950. It is contemplated that the regions may alternatively be other regions as described in relation to FIGS. 3 through 8. To accommodate the suppressed magnetic permeability desire, a second sheet 970 may be formed and sized to substantially equal a size of the bridge 966 as shown in FIG. 13. The second sheet 970 may be formed to have a thickness substantially equal to a thickness of the first sheet 952. The second sheet 970 may be of a non-ferromagnetic austenite stainless steel such as 304L stainless steel or 316L stainless steel. The bridge 966 may be punched out during a fabrication process and the second sheet 970 may be joined to the first sheet 952 to form a secondary bridge between the first magnet pocket 956 and the second magnet pocket 958.

The bridge 966 may be punched out to define first tapered sides of the rotor 950 at separated portions between the bridge 966 and the rotor 950. For example, the separated portions may be located at outer and inner rotor regions adjacent the bridge 966. The second sheet 970 may be formed to define second tapered sides 972. Each of the first tapered sides may define an angle corresponding to one of the second tapered sides 972 to assist in joining the first sheet 952 and the second sheet 970 to one another.

Alternatively, each of the regions 968 located at an outer portion of the rotor 950 of the first sheet 952 may be punched out to define third tapered sides. In this example, a third sheet may be formed with fourth tapered sides corresponding to the third tapered sides to join the third sheet to the first sheet 952 such that the third sheet is sized substantially equal to fill each of the regions 968 at the outer portion of the rotor 950.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. An electric machine rotor comprising:
   a first stamped rotor lamination defining a pair of magnet pockets, the first stamped rotor lamination defining openings having first adjacent wedge-shaped angled surfaces facing a first axial direction; and
   a first stamped sheet including bridges spanning the openings in the first stamped rotor lamination and having second adjacent wedge-shaped angled surfaces facing a second axial direction, wherein the first stamped sheet is of a material different than the first stamped rotor lamination, and wherein the first adjacent wedge-shaped angled surfaces and the second adjacent wedge-shaped angled surfaces are scarf jointed together to assemble the bridges between the magnet pockets to provide a region of the first stamped rotor lamination that has magnetic permeability less than, and mechanical strength greater than, the first stamped rotor lamination.

2. The rotor of claim 1 further comprising:
third adjacent wedge-shaped angled surfaces facing the first axial direction at a perimeter of the first stamped rotor lamination; and
outer bridges adjacent to the magnet pockets at a perimeter of the rotor and having fourth adjacent wedge-shaped angled surfaces facing a second axial direction, wherein the outer bridges are adjacent to one of the magnet pockets at a perimeter of the rotor, wherein the third adjacent wedge-shaped angled surfaces and the fourth adjacent wedge-shaped angled surfaces are scarf jointed together to assemble the bridges to the magnet pockets at a perimeter of the rotor, and wherein the outer bridges have magnetic permeability less than, and mechanical strength greater than, the first stamped rotor lamination.

3. The rotor of claim 1, wherein the first stamped rotor lamination further defines a triangular-shaped pocket having third adjacent wedge-shaped angled surfaces facing a first axial direction, further comprising:
a vertex portion having fourth adjacent wedge-shaped angled surfaces facing the second direction, wherein the vertex portion is of a material different than the first stamped rotor lamination, and wherein the third adjacent wedge-shaped angled surfaces and the fourth adjacent wedge-shaped angled surfaces are scarf jointed to provide a vertex portion of the triangular-shaped pocket that has mechanical strength greater than the first stamped rotor lamination.

4. The rotor of claim 1 wherein the first stamped rotor lamination further defines a triangular-shaped pocket having third adjacent wedge-shaped angled surfaces facing a first axial direction, further comprising:
a stamped ring including an outer perimeter and having fourth adjacent wedge-shaped angled surfaces facing the second axial direction, wherein the stamped ring is of a material different than the first stamped rotor lamination, and wherein the outer perimeter of the stamped ring is scarf jointed to the third adjacent wedge-shaped angled surfaces at an outer perimeter of the first stamped rotor lamination to circumscribe the first stamped rotor lamination, and wherein the stamped ring has mechanical strength greater than the first stamped rotor lamination.

5. The rotor of claim 1, wherein the bridges are anchor-shaped.

6. The rotor of claim 1, wherein a material of the first stamped rotor lamination is one of electrical steel or silicon steel and the material of the first stamped sheet is one of a non-ferromagnetic metal or a non-ferromagnetic alloy.

7. An electric machine rotor comprising:
a first stamped rotor lamination defining magnet pockets adjacent a perimeter thereof, the first stamped rotor lamination having first adjacent wedge-shaped angled surfaces adjacent the perimeter facing a first axial direction; and
a first stamped sheet including outer bridges adjacent to the magnet pockets at a perimeter of the rotor and having second adjacent wedge-shaped angled surfaces facing a second axial direction, wherein the first stamped sheet is of a material different than the first stamped rotor lamination, and wherein the first adjacent wedge-shaped angled surfaces and the second adjacent wedge-shaped angled surfaces are scarf jointed together to assemble outer bridges to the magnet pockets at a perimeter of the rotor, wherein the outer bridges have magnetic permeability less than, and mechanical strength greater than, the first stamped rotor lamination.

8. The rotor of claim 7 further comprising:
center bridges spanning openings between two magnet pockets in the first stamped rotor lamination, the center bridges having third adjacent wedge-shaped angled surfaces facing the second axial direction, and wherein the first stamped rotor lamination defines fourth adjacent wedge-shaped angled surfaces, and wherein the third adjacent wedge-shaped angled surfaces are scarf jointed to the fourth adjacent wedge-shaped angled surfaces between the magnet pockets, and wherein the center bridges have magnetic permeability less than, and mechanical strength greater than, the first stamped rotor lamination.

9. The rotor of claim 7, wherein the first stamped rotor lamination further defines triangular-shaped pockets having third adjacent wedge-shaped angled surfaces facing a first direction further comprising:
a second stamped sheet having vertex portions including fourth adjacent wedge-shaped angled surfaces facing the second axial direction, wherein the vertex portions are of a material different than the first stamped rotor lamination, and wherein the third adjacent wedge-shaped angled surfaces and the fourth adjacent wedge-shaped angled surfaces are joined together to assemble the vertex portions to the triangular-shaped pockets that have mechanical strength greater than the first stamped rotor lamination.

10. The rotor of claim 7 further comprising:
a stamped ring including an outer perimeter and having third adjacent wedge-shaped angled surfaces facing the second axial direction, wherein the stamped ring is of a material different than the first stamped rotor lamination, wherein the third adjacent wedge-shaped angled surfaces are joined to an outer perimeter of the first stamped rotor lamination at fourth adjacent wedge-shaped angled surfaces to circumscribe the first stamped rotor lamination, and wherein the stamped ring has mechanical strength greater than the first stamped rotor lamination.

11. The rotor of claim 7, wherein a material of the first stamped rotor lamination is one of electrical steel or silicon steel and the material of the first stamped sheet is one of a non-ferromagnetic metal or a non-ferromagnetic alloy.

12. An electric machine rotor comprising:
a first stamped rotor lamination defining magnet pockets, the first stamped rotor lamination having first adjacent wedge-shaped angled surfaces facing a first axial direction at a first outer perimeter thereof; and
a stamped ring including a second outer perimeter and having second adjacent wedge-shaped angled surfaces facing a second axial direction, wherein the stamped ring is of a material different than the first stamped rotor lamination, wherein the second outer perimeter is joined to the first outer perimeter of the first stamped rotor lamination to circumscribe the first stamped rotor lamination, wherein the stamped ring has mechanical strength greater than the first stamped rotor lamination.

13. The rotor of claim 12 further comprising:
a first stamped sheet including outer bridges adjacent to the magnet pockets at a perimeter of the rotor and having third adjacent wedge-shaped angled surfaces facing the second axial direction, wherein the first stamped sheet is of a material different than the first stamped rotor lamination, and wherein the third adjacent wedge-shaped angled surfaces and the first stamped rotor lamination defines fourth adjacent wedge-shaped angled surfaces, and wherein the third adjacent wedge-shaped angled surfaces are scarf jointed to the fourth adjacent wedge-shaped angled surfaces of the first stamped rotor lamination to define top bridges adjacent to the magnet pockets at a perimeter of the rotor, and wherein the outer bridges have magnetic permeability less than, and mechanical strength greater than, the first stamped rotor lamination.

14. The rotor of claim 12, wherein the first stamped rotor lamination further defines triangular-shaped pockets having third adjacent wedge-shaped angled surfaces facing a first direction further comprising:
a first stamped sheet having vertex portions including fourth adjacent wedge-shaped angled surfaces facing the second direction, wherein the vertex portions are of a material different than the first stamped rotor lamination, and wherein the third adjacent wedge-shaped angled surfaces and the fourth adjacent wedge-shaped angled surfaces are joined together to assemble the vertex portions of the triangular-shaped pockets that have mechanical strength greater than the first stamped rotor lamination.

15. The rotor of claim 12 further comprising:
center bridges spanning openings between two magnet pockets in the first stamped rotor lamination, the center bridges having third adjacent wedge-shaped angled surfaces facing the second direction, and wherein the first stamped rotor lamination defines fourth adjacent wedge-shaped angled surfaces, and wherein the third adjacent wedge-shaped angled surfaces are scarf jointed to the fourth adjacent wedge-shaped angled surfaces between the magnet pockets, and wherein the center bridges have magnetic permeability less than, and mechanical strength greater than, the first stamped rotor lamination.

16. The rotor of claim 15, wherein the center bridge is anchor-shaped.

17. The rotor of claim 12, wherein a material of the first stamped rotor lamination is one of electrical steel or silicon steel and the material of the stamped ring is one of a non-ferromagnetic metal or a non-ferromagnetic alloy.

* * * * *